(12) United States Patent
Iwai et al.

(10) Patent No.: US 12,224,957 B2
(45) Date of Patent: *Feb. 11, 2025

(54) COMMUNICATION APPARATUS AND REFERENCE SIGNAL RECEPTION METHOD

(71) Applicant: Sun Patent Trust, New York, NY (US)

(72) Inventors: Takashi Iwai, Ishikawa (JP); Sadaki Futagi, Ishikawa (JP); Tomohumi Takata, Ishikawa (JP); Daichi Imamura, Saitama (JP); Yoshihiko Ogawa, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,875

(22) Filed: Apr. 9, 2024

(65) Prior Publication Data

US 2024/0259156 A1     Aug. 1, 2024

Related U.S. Application Data

(63) Continuation of application No. 18/323,966, filed on May 25, 2023, now Pat. No. 11,985,086, which is a
(Continued)

(30) Foreign Application Priority Data

Jan. 29, 2009 (JP) .................. 2009-018632

(51) Int. Cl.
*H04L 5/00* (2006.01)
*H04L 25/02* (2006.01)
(Continued)

(52) U.S. Cl.
CPC ........ *H04L 5/0048* (2013.01); *H04L 25/0226* (2013.01); *H04L 27/2613* (2013.01); *H04L 25/022* (2013.01); *H04L 25/03159* (2013.01)

(58) Field of Classification Search
CPC .............. H04L 5/0048; H04L 25/0226; H04L 27/2613; H04L 25/022; H04L 25/03159;
(Continued)

(56) References Cited

U.S. PATENT DOCUMENTS 6,356,540 B1    3/2002  Kojiro
6,985,749 B2    1/2006  Bannasch et al.
(Continued)

FOREIGN PATENT DOCUMENTS

EP    2012454 A1    1/2009
EP    2252087 A1    11/2010
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0, Dec. 2012. (144 pages).
(Continued)

*Primary Examiner* — Lana N Le
(74) *Attorney, Agent, or Firm* — Seed IP Law Group LLP

(57) ABSTRACT

Disclosed are a wireless transmitter and a reference signal transmission method that improve channel estimation accuracy. In a terminal, which transmits a reference signal using n (n is a non-negative integer 2 or greater) band blocks (which correspond to clusters here), which are disposed with spaces therebetween in a frequency direction, a reference signal controller switches the reference signal formation method of a reference signal generator between a first formation method and a second formation method based on the number (n) of band blocks. In addition, a threshold value setting unit adjusts a switching threshold value based on the frequency spacing between band blocks. Thus, the reference
(Continued)

signal formation method can be selected with good accuracy and, as a result, channel estimation accuracy is further improved.

14 Claims, 18 Drawing Sheets

Related U.S. Application Data continuation of application No. 17/842,538, filed on Jun. 16, 2022, now Pat. No. 11,700,098, which is a continuation of application No. 17/130,591, filed on Dec. 22, 2020, now Pat. No. 11,394,507, which is a continuation of application No. 16/287,611, filed on Feb. 27, 2019, now Pat. No. 10,911,198, which is a continuation of application No. 13/146,611, filed as application No. PCT/JP2010/000496 on Jan. 28, 2010, now Pat. No. 10,263,744.

(51) Int. Cl.
  *H04L 25/03* (2006.01)
  *H04L 27/26* (2006.01)
(58) Field of Classification Search
  CPC ............... H04L 25/0224; H04L 5/001; H04L 27/26526; H04W 72/10; H04W 72/04; H04W 72/0406; H04W 72/0413; H04W 72/0426; H04W 72/044; H04W 72/06; H04W 72/0453; H04W 72/048; H04W 72/0486; H04W 72/08; H04W 72/0493; H04W 72/082; H04W 72/085; H04W 72/087
  See application file for complete search history.

(56) References Cited

U.S. PATENT DOCUMENTS

| | | | |
|---|---|---|---|
| 7,778,151 B2 | 8/2010 | Bertrand et al. |
| 7,835,262 B2 | 11/2010 | Balakrishnan et al. |
| 7,852,743 B2 | 12/2010 | Kwon et al. |
| 8,165,159 B2 | 4/2012 | Oketani et al. |
| 8,848,599 B2 | 9/2014 | Montojo et al. |
| 9,008,110 B2 | 4/2015 | Inoue et al. |
| 9,300,455 B2 | 3/2016 | Kim et al. |
| 9,641,291 B2 | 5/2017 | Nakao et al. |
| 2002/0164947 A1 | 11/2002 | Nabeshima et al. |
| 2003/0022651 A1 | 1/2003 | Bannasch et al. |
| 2004/0081131 A1 | 4/2004 | Walton et al. |
| 2004/0151109 A1 | 8/2004 | Batra et al. |
| 2005/0058153 A1 | 3/2005 | Santhoff et al. |
| 2005/0094550 A1 | 5/2005 | Huh et al. |
| 2006/0028976 A1 | 2/2006 | Park et al. |
| 2006/0133522 A1 | 6/2006 | Sutivong et al. |
| 2006/0211426 A1 | 9/2006 | Costa et al. |
| 2007/0211619 A1 | 9/2007 | Jalloul et al. |
| 2007/0297381 A1 | 12/2007 | Oketani et al. |
| 2008/0039098 A1 | 2/2008 | Papasakellariou et al. |
| 2008/0043708 A1 | 2/2008 | Muharemovic et al. |
| 2008/0049668 A1 | 2/2008 | Kakura et al. |
| 2008/0123616 A1 | 5/2008 | Lee |
| 2008/0186843 A1 | 8/2008 | Ma et al. |
| 2008/0219235 A1 | 9/2008 | Ma et al. |
| 2009/0080500 A1 | 3/2009 | Muharemovic et al. |
| 2009/0097465 A1 | 4/2009 | Inoue et al. |
| 2009/0201865 A1 | 8/2009 | Uemura et al. |
| 2010/0182966 A1 | 7/2010 | Kishiyama et al. |
| 2010/0208664 A1 | 8/2010 | Nishio et al. |
| 2010/0220710 A1 | 9/2010 | Sugawara et al. |
| 2011/0065468 A1 | 3/2011 | Parkvall et al. |
| 2011/0075629 A1 | 3/2011 | Seo et al. |
| 2011/0092242 A1 | 4/2011 | Parkvall et al. |
| 2011/0111785 A1 | 5/2011 | Lindoff et al. |
| 2011/0142009 A1 | 6/2011 | Lindoff et al. |
| 2011/0158200 A1 | 6/2011 | Bachu et al. |
| 2013/0250882 A1 | 9/2013 | Dinan |
| 2019/0253282 A1 | 8/2019 | Hadaschik et al. |
| 2020/0213161 A1 | 7/2020 | Zhang et al. |
| 2021/0160880 A1 | 5/2021 | Zhang et al. |
| 2021/0321442 A1 | 10/2021 | Jung et al. |
| 2022/0173951 A1 | 6/2022 | Ji et al. |
| 2022/0278802 A1 | 9/2022 | Noh et al. |
| 2023/0308153 A1* | 9/2023 | Zhang .................... H04L 5/001 |
| 2024/0048310 A1* | 2/2024 | Gong .................... H04L 5/0048 |
| 2024/0121796 A1* | 4/2024 | Nammi ............... H04W 72/048 |

FOREIGN PATENT DOCUMENTS

| | | |
|---|---|---|
| JP | 2007336437 A | 12/2007 |
| WO | WO 0147203 A2 | 6/2001 |
| WO | WO 2007122828 A1 | 11/2007 |
| WO | WO 2009116769 A1 | 9/2009 |
| WO | WO 2010077041 A2 | 7/2010 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 8)," 3GPP TS 36.212 V8.3.0, May 2008, 48 pages.

3GPP, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.3.0, May 2008, 77 pages.

3GPP, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.4.0, Sep. 2008. (78 pages).

English Translation of Russian Office Action, issued Oct. 22, 2013, for Russian Patent Application No. 2011131776/07(046817). (4 pages).

Extended European Search Report, dated Feb. 26, 2016, for European Patent Application No. 10735645.3. (5 pages).

Huawei, "CM issues for UL carrier aggregation," R1-091812, Agenda Item: 15.4, 3GPP TSG RAN WG1 meeting #57, San Francisco, USA, May 4-8, 2009. (4 pages).

Inoue, et al., "Performance Evaluation on Cubic Metric of Reference Signal in Discontinuous Spectrum Transmission," IEICE Communications Society Conference, Meiji University, Kawasaki, Japan, Sep. 16-19, 2008, p. 334. (4 pages)(with Partial English Translation).

Inoue, et al., "Proposal on Generation method of Reference Signal in LTE-Advanced Uplink," IEICE Technical Report RCS2009-188, *IEICE Technical Report Radio Communication Systems: RCS2009-167-RCS2009-206* 109(341):125-129, Dec. 10, 2009. (7 pages).

International Search Report, mailed May 11, 2010, for International Patent Application No. PCT/JP2010/000496. (4 pages).

Motorola, "Non-contiguous Resource Allocation in Uplink LTE-A," R1-090266, Agenda Item: 12.1, 3GPP TSG RAN1#55bis, Ljubljana, Slovenia, Jan. 12-16, 2009. (3 pages).

Motorola, "UL DM RS for LTE-A," R1-094855, Agenda Item: 7.4.1, 3GPP RAN WG1 #59, Jeju, South Korea, Nov. 9-13, 2009. (6 pages).

NEC Corporation, "Uplink Access Scheme for LTE-Advanced in BW=<20MHz," R1-083493, Agenda Item: 11, 3GPP TSG RAN1#54bis, Prague, Czech Rep., Sep. 29-Oct. 3, 2008. (16 pages).

NEC Group et al., "Mapping of UL RS sequence for clustered DFT-S-OFDM," R1-093865, Agenda Item: 7.2.4, 3GPP TSG RAN WG1 Meeting #58bis, Miyazaki, Japan, Oct. 12-16, 2009. (4 pages).

NEC Group et al., "Mapping of UL RS sequence for clustered DFT-S-OFDM," R1-094733, Agenda Item: 7.4.1, 3GPP TSG RAN WG1 Meeting #59, Jeju, Korea, Nov. 9-13, 2009. (4 pages).

Nokia et al., "Text proposal for capturing agreements on support of wider bandwidths," R1-084674, Agenda Item: 11.1, TSG-RAN WG1 #55, Prague, Czech Republic, Nov. 10-14, 2008. (2 pages).

(56) References Cited

OTHER PUBLICATIONS

Office Action, issued Dec. 16, 2013, for Australian Patent Application No. 2010209166. (4 pages).
Ogawa, et al., "A pilot signal on a non-contiguous data assignment for LTE-Advanced uplink," 2009 IEICE Communications Society Conference, Niigata University, Niigata, Japan, Sep. 15-18, 2009, p. 375. (5 pages) (with Partial English Translation).
Ogawa, et al., "Pilot signal receiving process on a non-contiguous data assignment for LTE-Advanced uplink," IEICE Technical Report, SIP2009-94.RCS2009-228, *IEICE Technical Report Radio Communication Systems: RCS2009-207-RCS2009-256*, 109(369): 121-126, Jan. 14, 2010. (8 pages).
Panasonic, "Comparison between Clustered DFT-s-OFDM and OFDM for supporting non-contiguous RB allocation within a component carrier," R1-084225, Agenda Item: 11.2, 3GPP TSG RAN WG1 Meeting #55, Prague, Czech Republic, Nov. 10-14, 2008. (7 pages).
Panasonic, "System performance of uplink non-contiguous resource allocation," R1-090257, Agenda Item: 12.1, 3GPP TSG RAN WG1 Meeting #55bis, Ljubljana, Jan. 12-16, 2009. (7 pages).
Panasonic, "Views on UL DM-RS," R1-094508, Agenda Item: 7.4.1, 3GPP TSG RAN WG1 Meeting #59, Jeju, Korea, Nov. 9-13, 2009. (4 pages).
Research In Motion, Limited, "On LTE-A Uplink Transmission Scheme in one Component Carrier," R1-090025, 3GPP TSG RAN WG1 Meeting #55bis, Ljubljana, Slovenia, Jan. 12-16, 2009. (5 pages).
Sharp, "Frequency Diversity and PAPR results for Uplink MA for LTE-Advanced," R1-083497, Agenda Item: 12, 3GPP TSG RAN WG1 Meeting #54bis, Prague, Czech Republic, Sep. 29-Oct. 3, 2008. (5 pages).

\* cited by examiner

| FREQUENCY INTERVAL | NUMBER OF CLUSTERS | TRANSMISSION METHOD |
| --- | --- | --- |
| FREQUENCY INTERVAL ≥ Y | NUMBER OF CLUSTERS > N1 | TRANSMISSION METHOD (a) |
| | NUMBER OF CLUSTERS ≤ N1 | TRANSMISSION METHOD (a) |
| FREQUENCY INTERVAL < Y | NUMBER OF CLUSTERS > N2 | TRANSMISSION METHOD (a) |
| | NUMBER OF CLUSTERS ≤ N2 | TRANSMISSION METHOD (a) |

FIG. 15

COMMUNICATION APPARATUS AND REFERENCE SIGNAL RECEPTION METHOD

BACKGROUND

Technical Field

The present disclosure relates to a radio transmission apparatus and a reference signal transmission method.

Description of the Related Art

For an uplink channel of LTE-Advanced, which is an evolved version of 3rd generation partnership project long-term evolution (3GPP LTE), using both contiguous frequency transmission and non-contiguous frequency transmission is under consideration (see Non-Patent Literature 1). That is, in communication from each radio communication terminal apparatus (hereinafter referred to as "terminal") to a radio communication base station apparatus (hereinafter referred to as "base station"), contiguous frequency transmission and non-contiguous frequency transmission are switched.

Contiguous frequency transmission is a method of transmitting a data signal and a reference signal (RS) by allocating such signals to contiguous frequency bands. For example, as shown in FIG. 1, in contiguous frequency transmission, a data signal and a reference signal are allocated to contiguous transmission bands. In contiguous frequency transmission, a base station allocates contiguous frequency bands to each terminal based on the reception quality per frequency band for each terminal, so that it is possible to obtain frequency scheduling effects.

On the other hand, non-contiguous frequency transmission is a method of transmitting a data signal and a reference signal by allocating such signals to non-contiguous frequency bands, which are dispersed in a wide range of band. For example, as shown in FIG. 2, in non-contiguous frequency transmission, it is possible to allocate a data signal and a reference signal to transmission bands which are dispersed all over the frequency band. In non-contiguous frequency transmission, compared to contiguous frequency transmission, the flexibility of assignment of a data signal and a reference signal to frequency bands is improved, so that it is possible to gain greater frequency scheduling effects. Further, in non-contiguous frequency transmission, it is possible to decrease the probability that all of a data signal or a reference signal of a terminal will get in a valley in fading. That is, according to non-contiguous transmission, it is possible to obtain frequency diversity effects and suppress deterioration of reception characteristics.

Further, in LTE, as shown in FIGS. 1 and 2, a terminal transmits a data signal and a reference signal in the same transmission band (see Non-Patent Literature 2). Then, a base station estimates a channel estimation value of the transmission band to which a data signal of each terminal is allocated, using a reference signal, and demodulates the data signal using the channel estimation value.

Further, in LTE, as a reference signal to use for propagation path estimation of an uplink channel, an orthogonal code called a cyclic shift sequence, which has high interference suppression effects, is employed (see Non-Patent Literature 3). Because one code sequence (ZC sequence) allocated to each base station (cell) is cyclically shifted by a different amount of cyclic shift, it is possible to obtain a plurality of cyclic shift sequences which are orthogonal to each other. An amount of shifting between cyclic shift sequences is set greater than delay time in a multipath channel. As shown in FIG. 3, a terminal transmits a cyclic shift sequence generated using a different amount of cyclic shift per terminal or antenna. A base station obtains a correlation value corresponding to each cyclic shift sequence by receiving a plurality of cyclic shift sequences that are multiplexed in a channel and performing a correlation calculation on a received signal and a base code sequence. That is, as shown in FIG. 4, the correlation value corresponding to cyclic shift sequence (CS #2) appears at the position which is shifted by cyclic shift width Δ from the position at which the correlation value corresponding to cyclic shift sequence (CS #1) appears. By setting cyclic shift width Δ greater than delay time in a multipath channel, it is possible to extract a correlation value in the period (detection window) in which an incoming wave of the desired wave exists.

Here, as a method of transmitting a reference signal in non-contiguous frequency transmission, two methods are possible. First, in transmission method (a) in FIG. 5, reference signals are generated from one code sequence. That is, transmission is performed by dividing one code sequence by a width corresponding to the bandwidth of each contiguous frequency band (hereinafter referred to as "cluster"), and allocating the obtained subsequence to each cluster.

On the other hand, in transmission method (b) in FIG. 6, reference signals are generated from a plurality of code sequences. That is, transmission is performed by generating a plurality of code sequences corresponding to the bandwidth of each cluster, and allocating each code sequence to clusters.

CITATION LIST

Non-Patent Literature

NPL 1
R1-090257, Panasonic, "System performance of uplink non-contiguous resource allocation"
NPL 2
3GPP TS 36.212 V8.3.0, "E-UTRA Multiplexing and channel coding (Release 8)," 2008-05
NPL 3
3GPP TS 36.211 V8.3.0, "Physical Channels and Modulation (Release 8)," 2008-05

BRIEF SUMMARY

Technical Problem

However, the above-described method of transmitting a reference signal in non-contiguous frequency transmission has the following problem.

In transmission method (a), compared to transmission method (b), a coding sequence (a correlation length) can be made longer. That is, transmission method (a) has an advantage of reducing interference. Specifically, in the case where a ZC sequence is used as a code sequence, when a sequence length is N, the cross-correlation value between ZC sequences will be constant at $1/\sqrt{N}$. When sequence length N doubles, the cross-correlation value will be $1/\sqrt{2}$ times, making it possible to suppress inter-cell interference power value lower by 3 dB.

However, transmission method (a) has a problem that accuracy of channel estimation deteriorates when the number of clusters is large or channel variation in the frequency band between clusters is significant. As shown in FIG. 7, when transmission method (a) is adopted, a base station obtains a correlation value (that is, a delay profile) by performing complex division on a received reference signal that is obtained by connecting a reference signal received as a plurality of clusters back to one code sequence, and a reference signal replica, in the frequency domain, and by performing IDFT processing on the result of division to convert into the time domain. At the point where reference signals are connected, channel variation becomes noncontinuous, and interference occurs resulting from this noncontinuity. This interference increases as the number of clusters is greater, because the number of noncontinuous points increases as the number of clusters is greater. Further, when the number of clusters is greater, a bandwidth per cluster becomes narrower and a correlation length becomes smaller, decreasing interference suppression effects and further increasing interference effects. As described above, when interference increases, the accuracy of detecting a desired wave deteriorates and separation of a plurality of cyclic shift sequences becomes difficult, drastically deteriorating the accuracy of channel estimation as well.

On the other hand, transmission method (b) has an advantage that deterioration of the accuracy of channel estimation can be prevented even when channel variation between clusters is significant. As shown in FIG. 8, when transmission method (b) is adopted, a base station obtains a correlation value (delay profile) by performing complex division on a received reference signal of each cluster and a reference signal replica, in the frequency domain, and by performing IDFT processing on the result of division to convert into the time domain. In transmission method (b), because there is no noncontinuous point of channel variation as is in transmission method (a), it is possible to prevent interference from occurring.

However, transmission method (b) has a problem that, because a sequence length per cluster (a correlation length) is shorter, compared with transmission method (a), interference suppression effects decrease and the accuracy of channel estimation deteriorates. For example, when the number of clusters is 2 and the bandwidths of the two clusters are equal, the interference level in transmission method (b) increases 3 dB greater than the interference level in transmission method (a).

It is therefore an object of the present disclosure to provide a radio transmission apparatus and a reference signal transmission method for improving the accuracy of channel estimation.

Solution to Problem

One aspect of a radio transmission apparatus according to the present disclosure employs a configuration to have a radio transmission apparatus that transmits a reference signal using n (n is a natural number of 2 or greater) bandwidth blocks that are positioned at intervals from each other in a direction of frequency, the apparatus comprising: a formation section that forms the reference signal based on one of a first formation method, in which n subsequences are formed as the reference signal by dividing one base code sequence into a length to match each bandwidth block, and a second formation method, in which n code sequences are formed as the reference signal by adjusting lengths of n base code sequences to match each bandwidth block; and a switch section that switches reference signal formation methods in the formation section between the first formation method and the second formation method based on a switch threshold value and the number of the bandwidth blocks n.

One aspect of a reference signal transmission method according to the present disclosure employs a configuration to have a reference signal transmission method of transmitting a reference signal using n (n is a natural number of 2 or greater) bandwidth blocks that are positioned at intervals from each other in a direction of frequency, the method comprising steps of: forming the reference signal based on one of a first formation method, in which n subsequences are formed as the reference signal by dividing one base code sequence into a length to match each bandwidth block, and a second formation method, in which n code sequences are formed as the reference signal by adjusting lengths of n base code sequences to match each bandwidth block; and switching reference signal formation methods in a formation section between the first formation method and the second formation method based on a switch threshold value and the number of the bandwidth blocks n.

Advantageous Effects of Invention

According to the present disclosure, it is possible to provide a radio transmission apparatus and a reference signal transmission method for improving the accuracy of channel estimation.

BRIEF DESCRIPTION OF THE SEVERAL VIEWS OF THE DRAWINGS

FIG. 15 shows switch control between the first reference signal formation method and the second reference signal formation method according to Embodiment 1.

DETAILED DESCRIPTION

Now, embodiments of the present disclosure will be described in detail with reference to the accompanying drawings.

Embodiment 1

[Configuration of Terminal]

Figure 1:
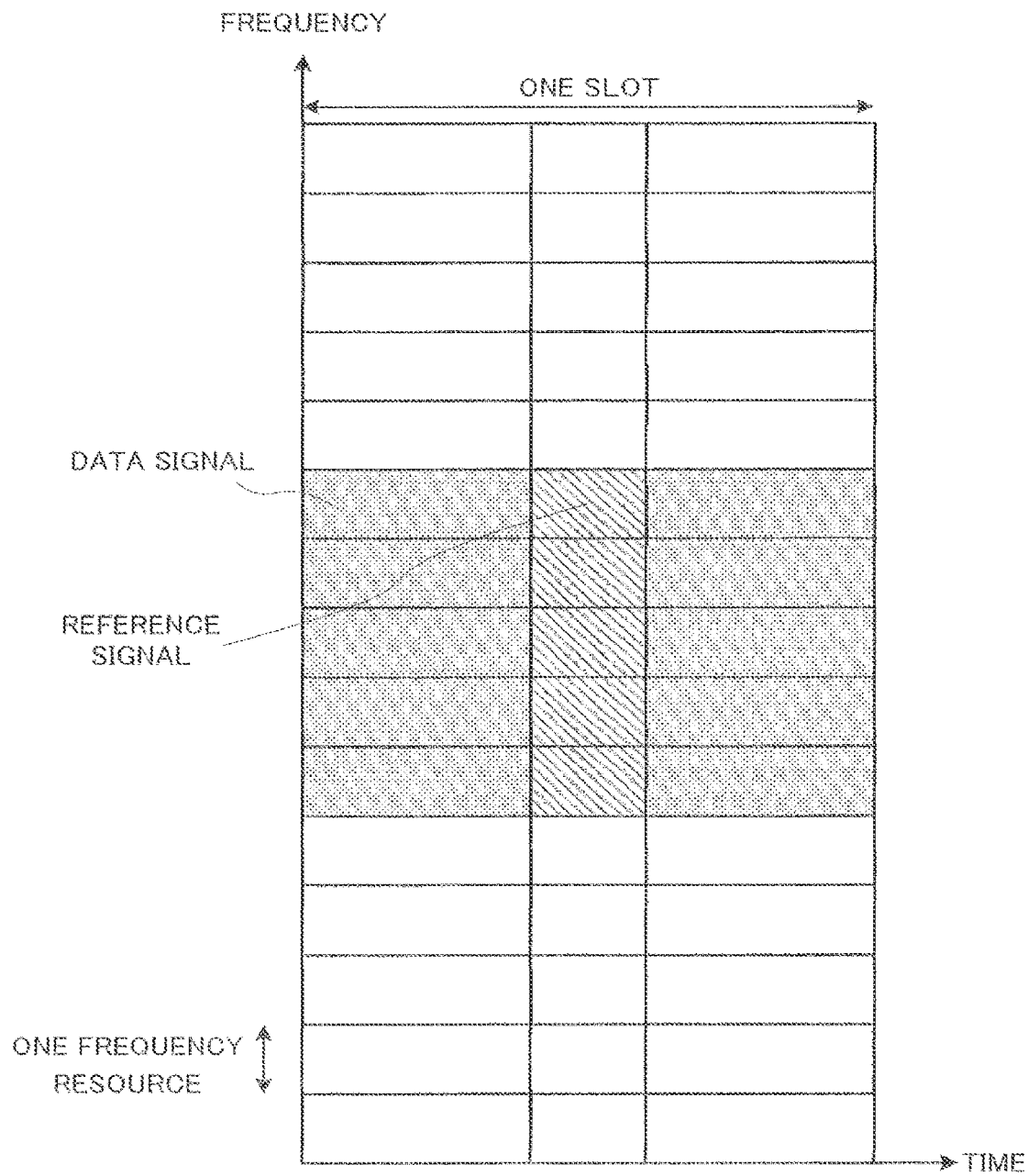
FIG. 1 shows contiguous frequency transmission.
Figure 2:
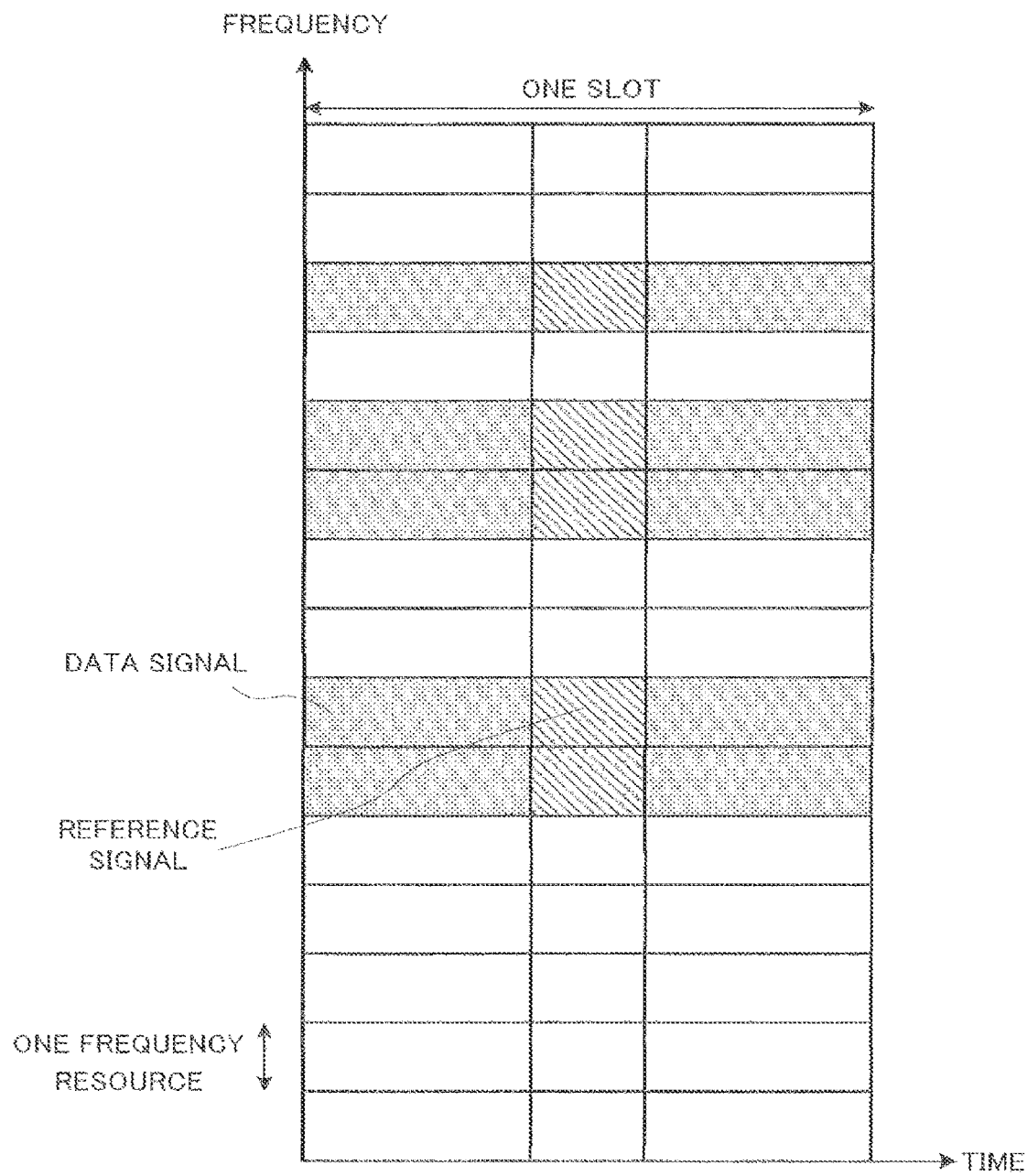
FIG. 2 shows non-contiguous frequency transmission.
Figure 3:
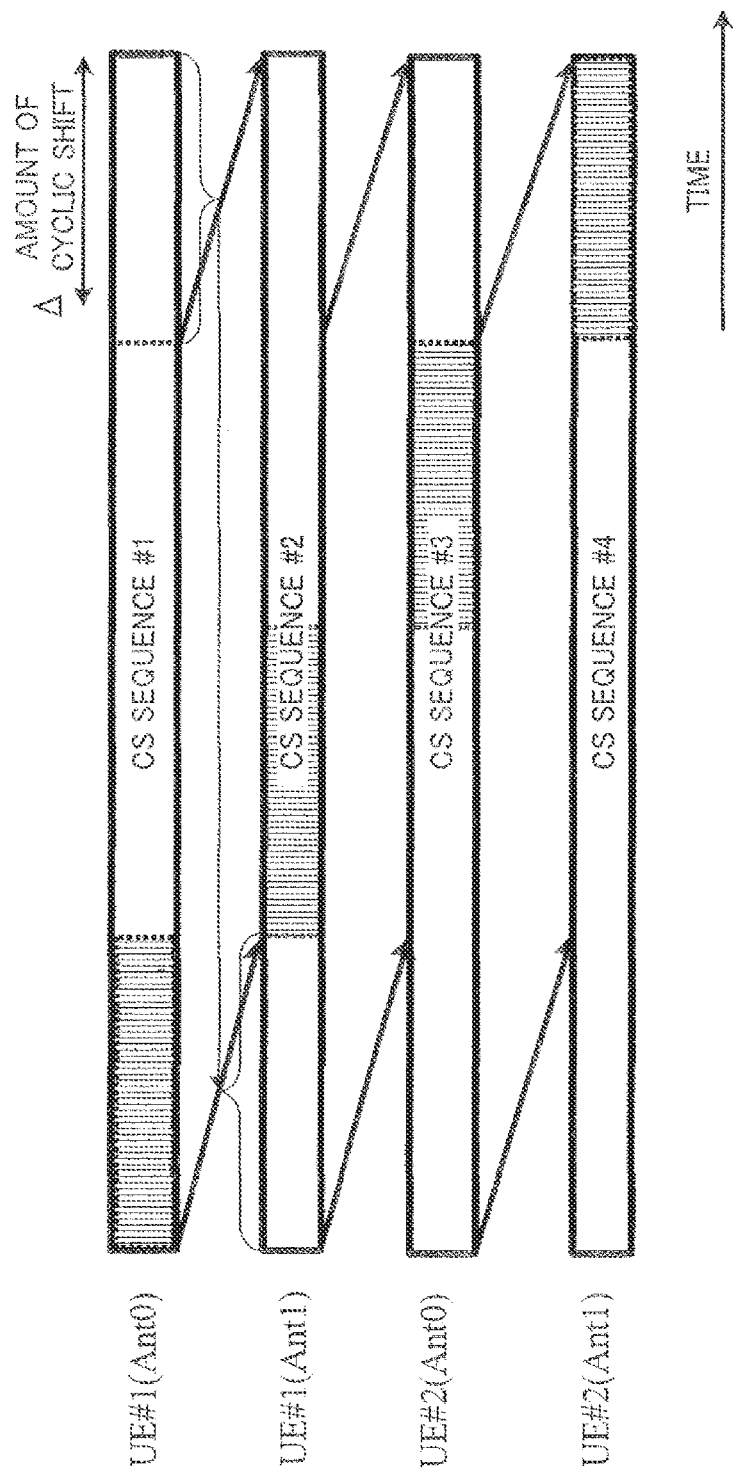
FIG. 3 shows cyclic shift sequences.
Figure 4:
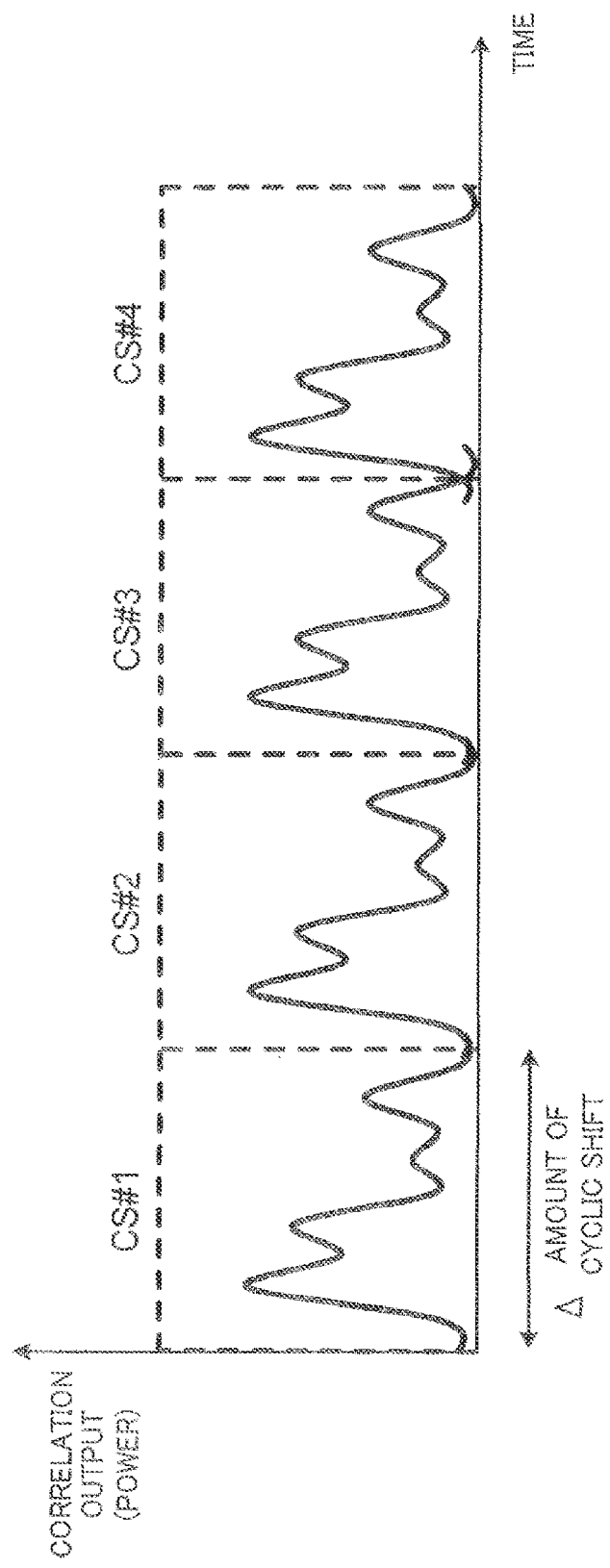
FIG. 4 shows correlation values corresponding to cyclic shift sequences.
Figure 5:
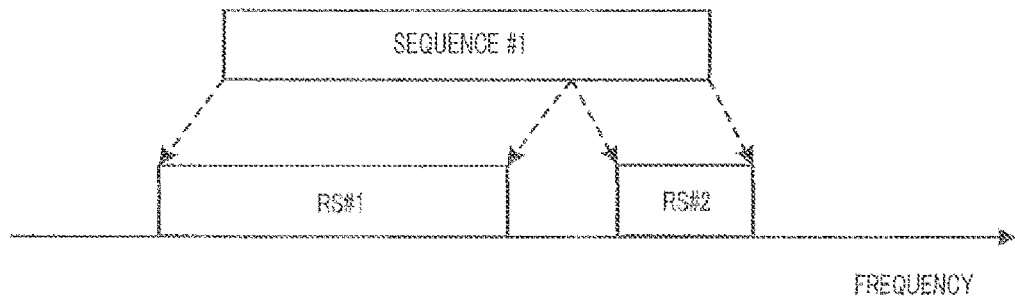
FIG. 5 shows reference signal transmission method (a) in non-contiguous frequency transmission.
Figure 6:
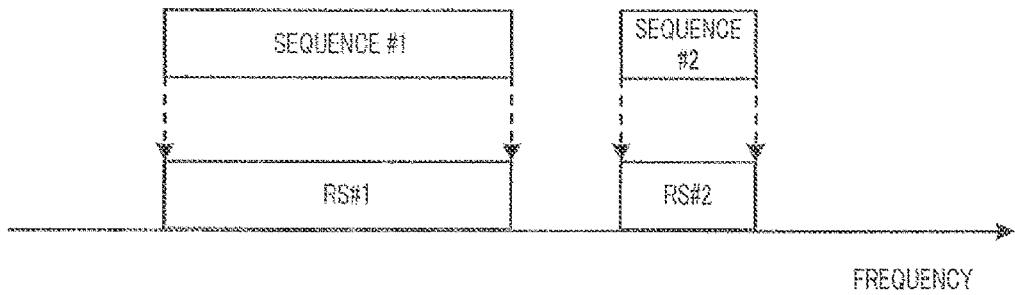
FIG. 6 shows reference signal transmission method (b) in non-contiguous frequency transmission.
Figure 7:
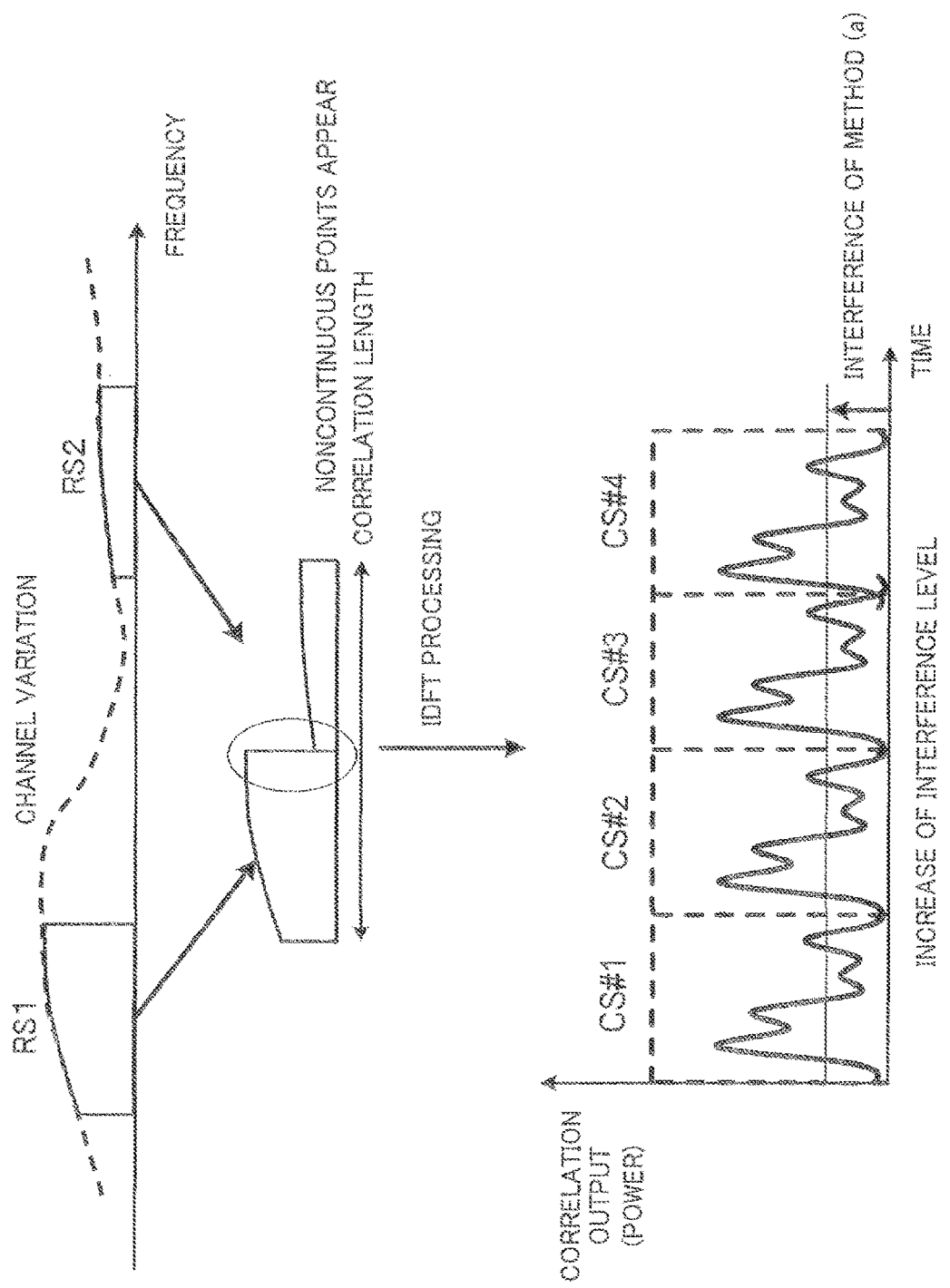
FIG. 7 shows a problem in reference signal transmission method (a)
Figure 8:
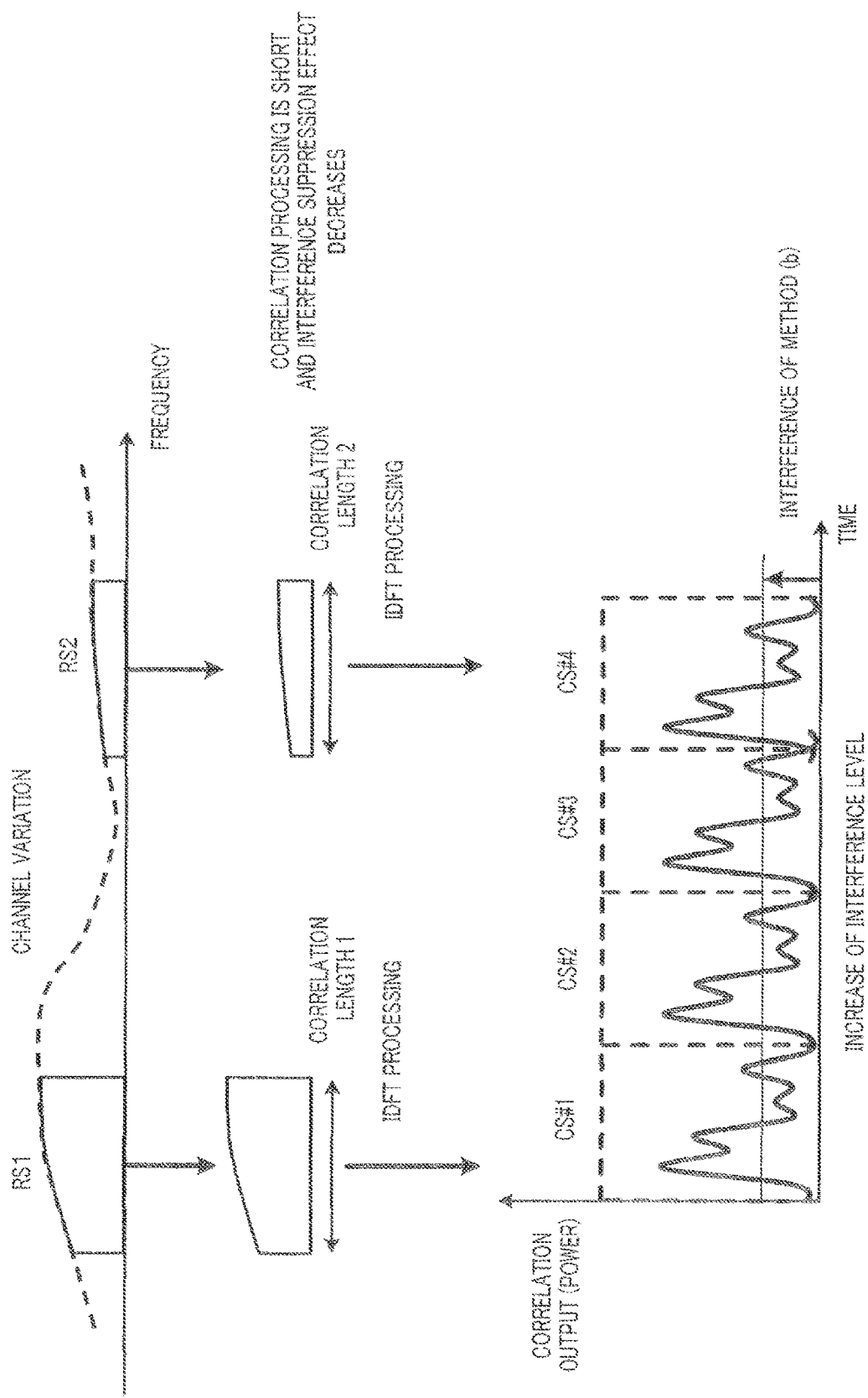
FIG. 8 shows a problem in reference signal transmission method (b)
Figure 9:
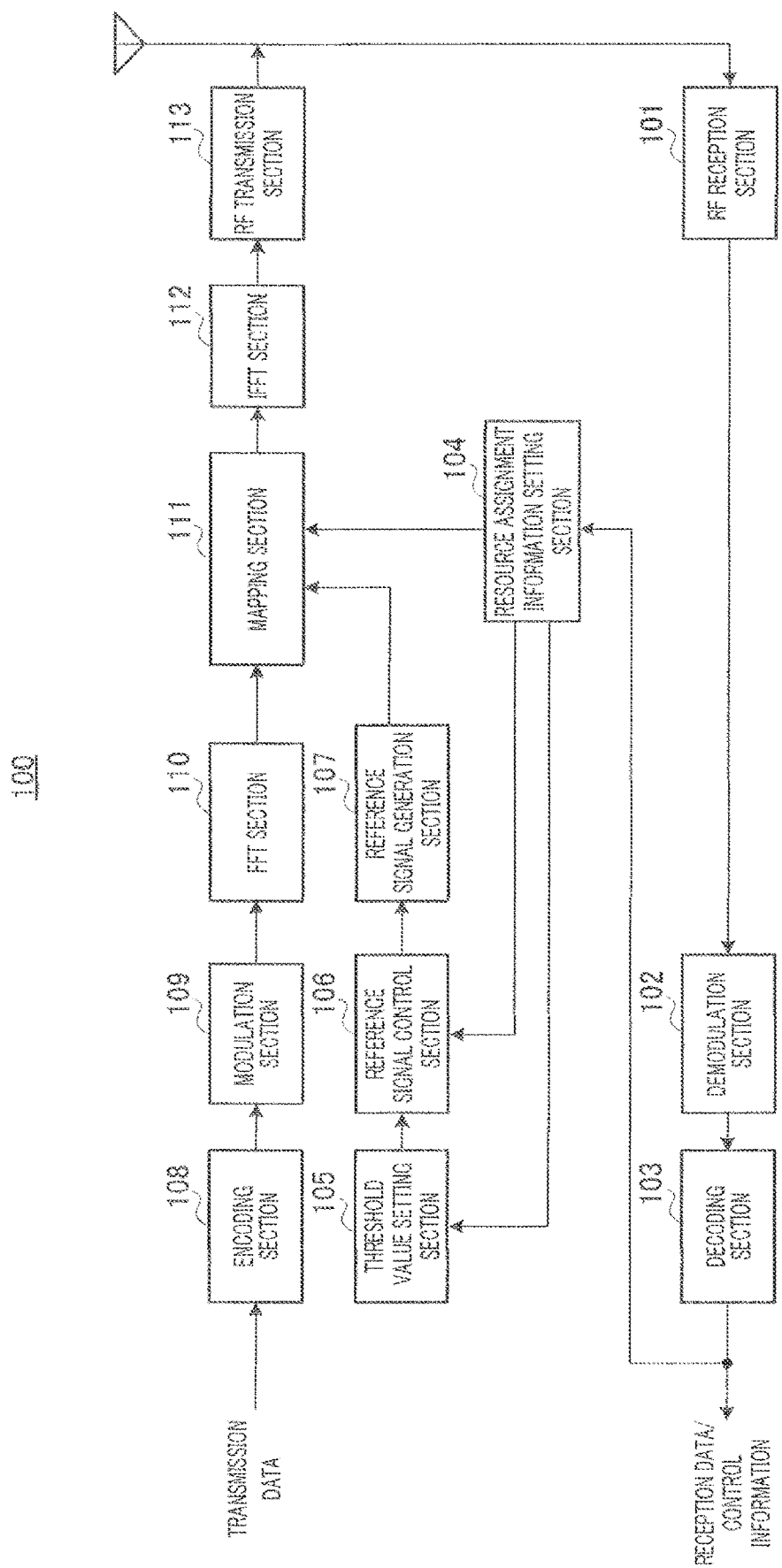
FIG. 9 is a block diagram showing a configuration of a terminal according to Embodiment 1 of the present invention.

FIG. 9 is a block diagram showing a configuration of terminal 100 according to Embodiment 1 of the present disclosure. In FIG. 9, terminal 100 is provided with RF reception section 101, demodulation section 102, decoding section 103, resource assignment information setting section 104, threshold value setting section 105, reference signal control section 106, reference signal generation section 107, encoding section 108, modulation section 109, fast Fourier transform (FFT) section 110, mapping section 111, inverse fast Fourier transform (IFFT) section 112, and RF transmission section 113.

RF reception section 101 performs reception processing such as down-conversion and A/D conversion on a signal received via an antenna, and outputs the signal on which reception processing is performed to demodulation section 102.

Demodulation section 102 performs equalization processing and demodulation processing on the signal received from RF reception section 101, and outputs the processed signal to decoding section 103.

Decoding section 103 performs decoding processing on the signal received from demodulation section 102 and extracts reception data and control information.

Encoding section 108 encodes transmission data and outputs the obtained encoded data to modulation section 109.

Modulation section 109 modulates the encoded data received from encoding section 108 and outputs the modulated signal to FFT section 110.

FFT section 110 performs FFT processing on the modulated signal received from modulation section 109 and outputs the obtained signal to mapping section 111.

Mapping section 111 maps a data signal received from FFT section 110 and a reference signal received from reference signal generation section 107 to a frequency domain resource according to a frequency assignment information received from resource assignment information setting section 104, and outputs the obtained signal to IFFT section 112.

Threshold value setting section 105 adjusts a switch threshold value in reference signal control section 106. Threshold value setting section 105 receives information about clusters from resource assignment information setting section 104 and adjusts a switch threshold value in reference signal control section 106 based on a frequency interval between clusters.

Reference signal control section 106 receives information about clusters from resource assignment information setting section 104, compares which one of the number of clusters and the switch threshold value is smaller or greater, and, based on the result of the comparison, determines a method of forming a reference signal in reference signal generation section 107. Reference signal control section 106 switches reference signal formation methods in reference signal generation section 107 by outputting identification information of the determined reference signal formation method to reference signal generation section 107.

Resource assignment information setting section 104 outputs frequency assignment information about a reference signal and a data signal, including the number of clusters, a frequency position and a bandwidth of each cluster, to threshold value setting section 105, reference signal control section 106, and mapping section 111. Contents of resource assignment information are reported from base station 200 (described later) to terminal 100, and are input to resource assignment information setting section 104 via RF reception section 101, demodulation section 102, and decoding section 103.

Reference signal generation section 107 generates a reference signal based on a reference signal formation method indicated by identification information received from reference signal control section 106, and outputs the reference signal to mapping section 111. As methods of forming a reference signal, as described above, there are a first formation method (transmission method (a)), in which subsequences corresponding to the number of clusters are formed as a reference signal by dividing one base code sequence into the length to match each cluster, and a second formation method (transmission method (b)), in which base code sequences corresponding to the number of clusters are formed as a reference signal by adjusting lengths of base code sequences corresponding to the number of clusters to match each cluster.

IFFT section 112 performs IFFT processing on the signal received from mapping section 111 and outputs the obtained signal to RF transmission section 113.

RF transmission section 113 performs transmission processing such as D/A conversion, up-conversion, and amplification on the signal received from IFFT section 112, and transmits the obtained signal by air to base station 200 via an antenna.

[Configuration of Base Station]

Figure 10:
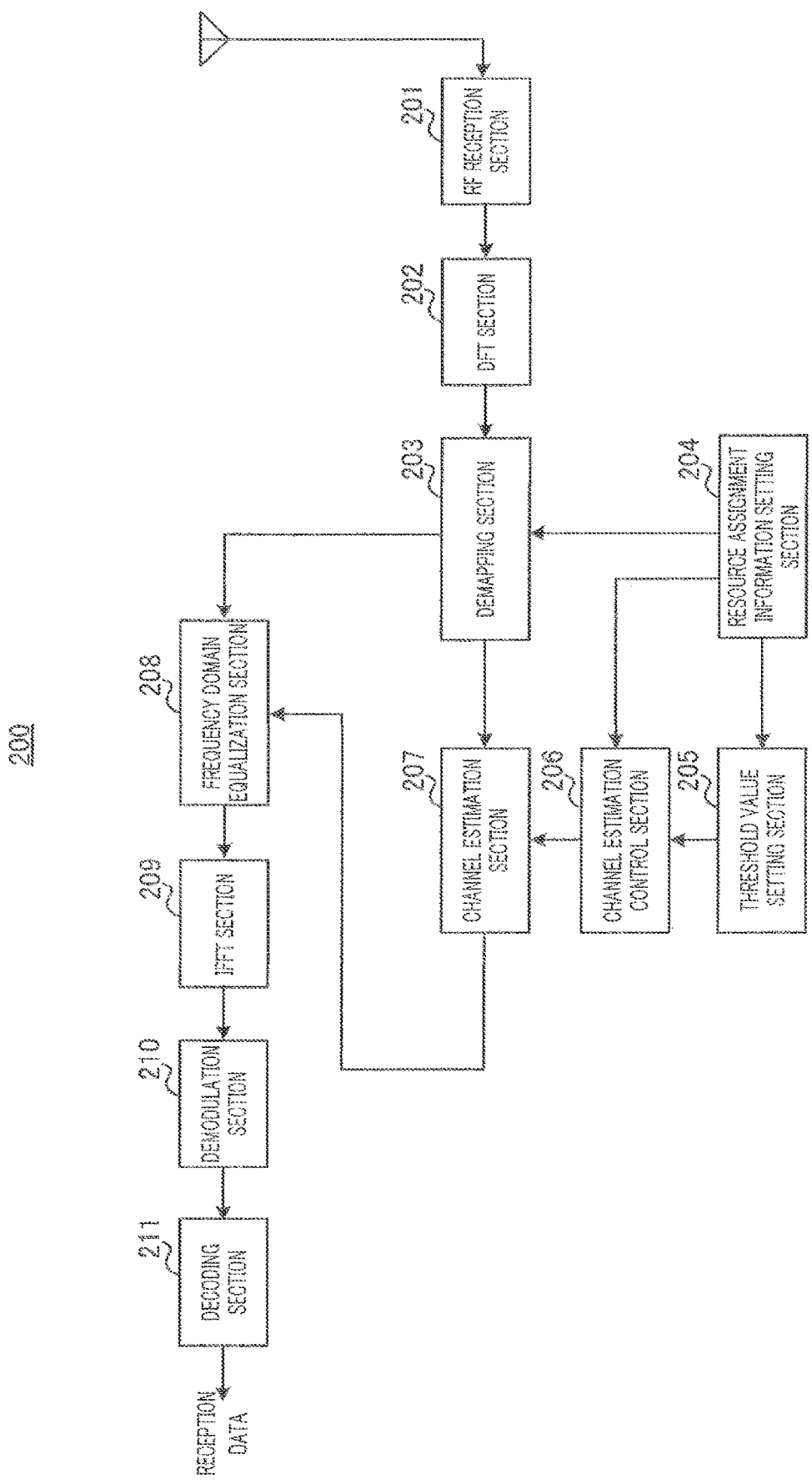
FIG. 10 is a block diagram showing a configuration of a base station according to Embodiment 1 of the present invention.

FIG. 10 is a block diagram showing a configuration of base station 200 according to Embodiment 1 of the present disclosure. In FIG. 10, base station 200 is provided with RF reception section 201, discrete Fourier transform (DFT) section 202, demapping section 203, resource assignment information setting section 204, threshold value setting section 205, channel estimation control section 206, channel estimation section 207, frequency domain equalization section 208, IFFT section 209, demodulation section 210, and decoding section 211.

RF reception section 201 performs reception processing such as down-conversion and A/D conversion on a signal received via an antenna, and outputs the obtained signal to DFT section 202.

DFT section 202 performs DFT processing on the signal received from RF reception section 201 to convert a time domain signal into a frequency domain signal. Then, DFT section 202 outputs the frequency domain signal to demapping section 203.

Demapping section 203 extracts a data signal and a reference signal from the frequency domain signal received from DFT section 202 according to the frequency assignment information received from resource assignment information setting section 204. Then, demapping section 203 outputs the extracted data signal to frequency domain equalization section 208 and outputs the reference signal to channel estimation section 207.

Resource assignment information setting section 204 outputs a frequency assignment information that is allocated to terminal 100, including the number of clusters, a frequency position and a bandwidth of each cluster, to threshold value setting section 205, channel estimation control section 206, and demapping section 203. In this regard, contents of resource assignment information are reported from base station 200 to terminal 100 in advance.

Threshold value setting section 205 adjusts a switch threshold value in channel estimation control section 206. Threshold value setting section 205 receives information about clusters from resource assignment information setting section 204, and adjusts the switch threshold value in channel estimation control section 206 based on the frequency interval between clusters.

Channel estimation control section 206 switches a channel estimation method in channel estimation section 207 to a channel estimation method corresponding to the reference signal transmission method in terminal 100. That is, channel estimation control section 206 receives information about clusters from resource assignment information setting section 204, compares which one of the number of clusters and a switch threshold value is smaller or greater, and, based on the result of the comparison, determines a channel estimation method in channel estimation section 207. Channel estimation control section 206 switches channel estimation methods in channel estimation section 207 by outputting identification information of the determined channel estimation method to channel estimation section 207.

Channel estimation section 207 performs channel estimation using the channel estimation method indicated by identification information received from channel estimation control section 206, and outputs the result of channel estimation to frequency domain equalization section 208. A configuration of channel estimation section 207 will be described in detail later.

Frequency domain equalization section 208 performs equalization processing on the data signal received from demapping section 203 using the channel estimation result (i.e., a channel frequency response) received from channel estimation section 207. Then, frequency domain equalization section 208 outputs the result of equalization processing to IFFT section 209.

IFFT section 209 performs IFFT processing on the data signal received from frequency domain equalization section 208 and outputs the obtained signal to demodulation section 210.

Demodulation section 210 performs demodulation processing on the signal received from IFFT section 209 and outputs the obtained signal to decoding section 211. Decoding section 211 performs decoding processing on the signal received from demodulation section 210, and outputs the obtained reception data.

Figure 11:
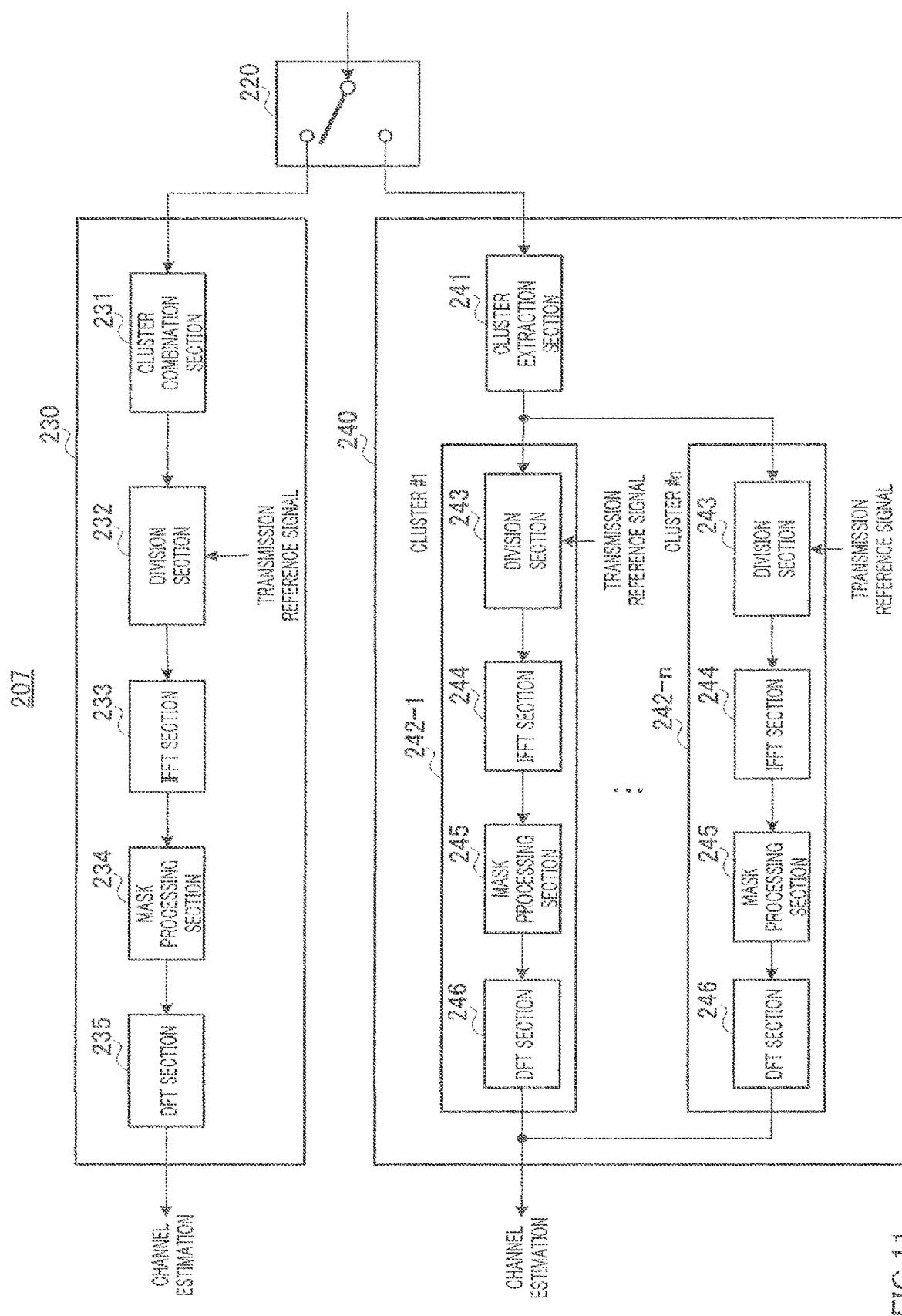
FIG. 11 is a block diagram showing a configuration of the channel estimation section in FIG. 10.

FIG. 11 is a block diagram showing a configuration of channel estimation section 207. In FIG. 11, channel estimation section 207 is provided with switching switch 220, estimation processing section 230, and estimation processing section 240.

Switching switch 220 redirects the output of the reference signal received from demapping section 203 to estimation processing section 230 or estimation processing section 240 based on identification information received from channel estimation control section 206.

Estimation processing section 230 performs a first channel estimation method corresponding to the first reference signal formation method. Estimation processing section 230 is provided with cluster combination section 231, division section 232, IFFT section 233, mask processing section 234, and DFT section 235.

Cluster combination section 231 connects, in a frequency domain, a plurality of clusters used to transmit a reference signal in terminal 100, and outputs the received reference signal thus obtained to division section 232.

Division section 232 performs complex division on the received reference signal received from cluster combination section 231 using the reference signal replica (i.e., the reference signal transmitted from terminal 100). Then, division section 232 outputs the result of division (i.e., a correlation value) to IFFT section 233.

IFFT section 233 performs IFFT processing on the signal received from division section 232, and outputs the obtained signal to mask processing section 234.

Mask processing section 234, as an extraction means of a requested desired wave, extracts a correlation value at a period (a detection window) in which a correlation value of the desired cyclic shift sequence by performing mask processing on the signal received from IFFT section 233, which is equivalent to a delay profile, based on an amount of cyclic shift used in terminal 100. Then, mask processing section 234 outputs the extracted correlation value to DFT section 235.

DFT section 235 performs DFT processing on the correlation value input from mask processing section 234 and outputs the obtained signal to frequency domain equalization section 208. This signal output from DFT section 235 is a channel estimation value in which channel variation (i.e., a channel frequency response) is estimated.

Estimation processing section 240 performs a second channel estimation method corresponding to the second reference signal formation method. Estimation processing section 240 is provided with cluster extraction section 241 and estimation value calculation sections 242-1 to n which correspond to each cluster. Estimation value calculation section 242 is provided with division section 243, IFFT section 244, mask processing section 245, and DFT section 246.

Cluster extraction section 241 outputs each of the number of clusters n used to transmit a reference signal in terminal 100 to estimation value calculation sections 242-1 to n. Estimation value calculation section 242 performs the same processing as performed in division section 232, IFFT section 233, mask processing section 234, and DFT section 235.

[Operation of Terminal]

Terminal 100 having the above configuration will be described below.

As described above, in terminal 100, reference signal control section 106 switches reference signal formation methods by controlling reference signal generation section 107.

Figure 12:
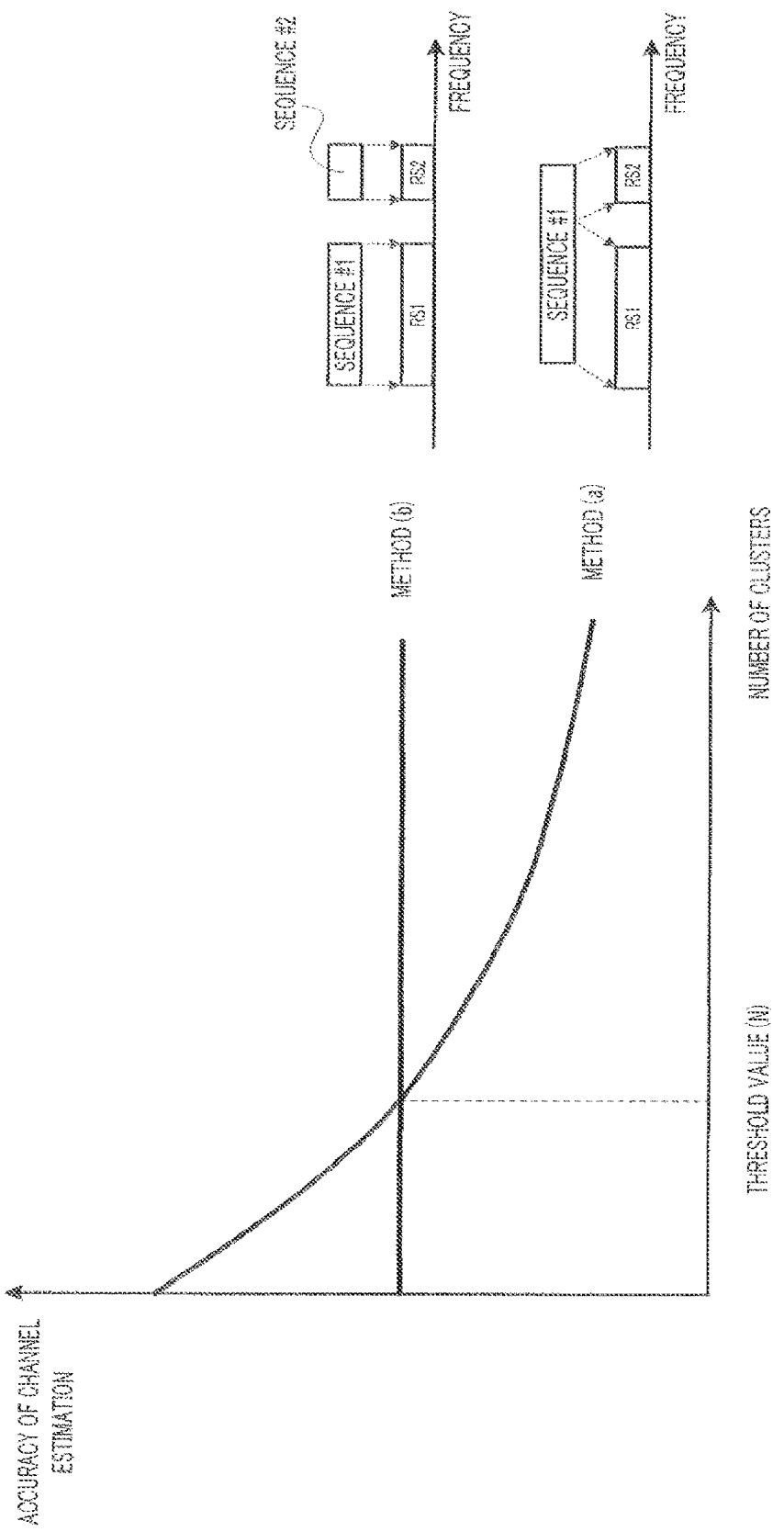
FIG. 12 shows a relationship between the first reference signal formation method and the second reference signal formation method according to Embodiment 1.

The above-described first reference signal formation method (transmission method (a)) and second reference signal formation method (transmission method (b)) have the relationship shown in FIG. 12. That is, the accuracy of channel estimation is constant regardless of the number of clusters when the second reference signal formation method is used. On the other hand, the accuracy of channel estimation tends to lower as the number of clusters increases when the first reference signal formation method is used. Therefore, with a certain number of clusters N being a threshold, the accuracy of channel estimation of the first reference signal formation method and the accuracy of channel estimation of the second reference signal formation method are reversed. That is, when the number of clusters is N or smaller, the channel estimation value of the first reference signal formation method exceeds the channel estimation value of the second reference signal formation method, while, inversely, when the number of clusters is greater than N, the channel estimation value of the second reference signal formation method exceeds the channel estimation value of the first reference signal formation method.

Figure 13:
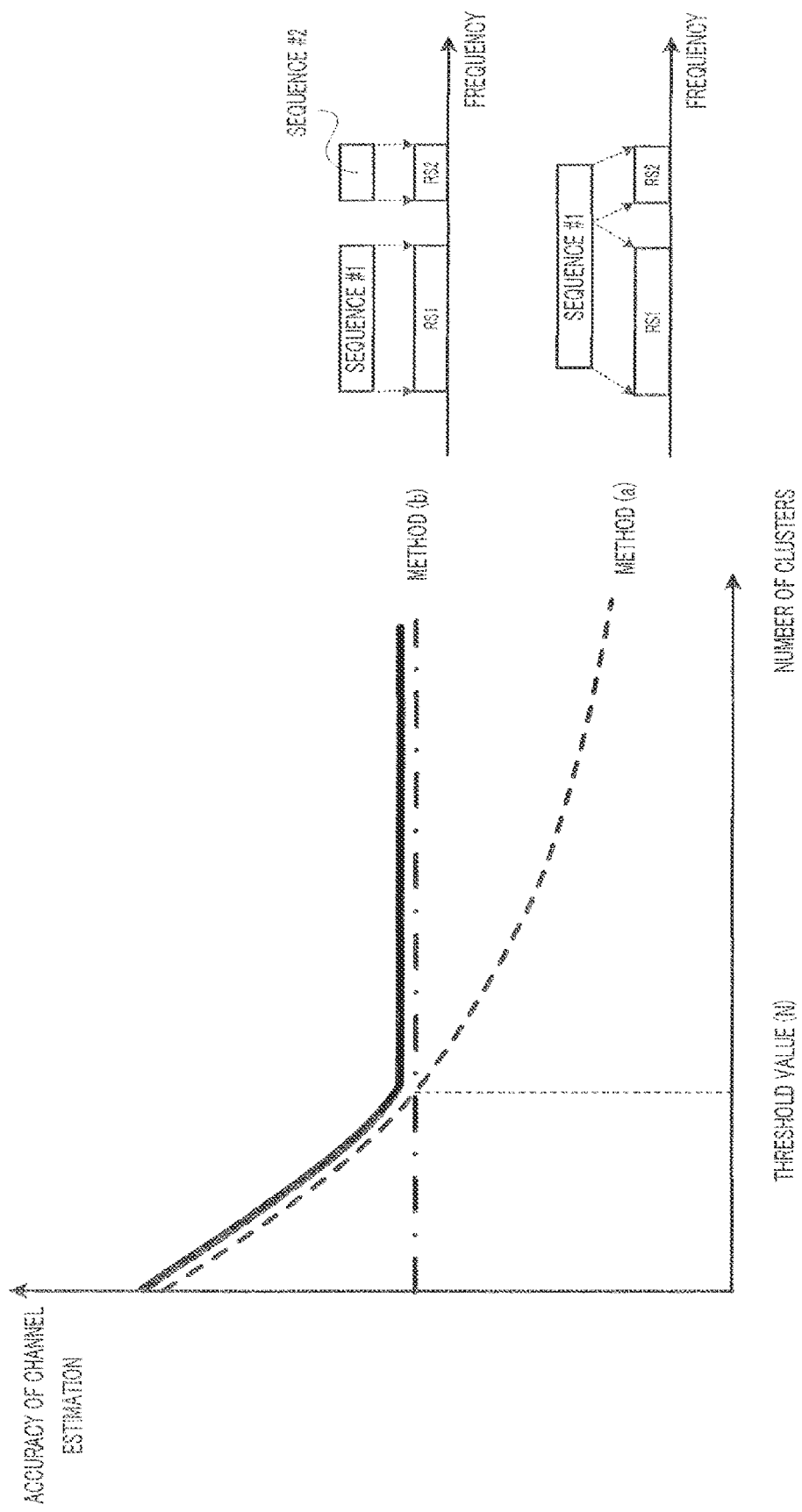
FIG. 13 shows switch control between the first reference signal formation method and the second reference signal formation method according to Embodiment 1.

Therefore, by using the number of clusters of a point at which the accuracy of channel estimation of the first reference signal formation method and the accuracy of channel estimation of the second reference signal formation method are reversed as a switch threshold value, it is possible to select a more advantageous reference signal formation method with respect to the accuracy of channel estimation according to the number of clusters. By performing this kind of switch control of reference signal formation methods, base station 200 can obtain the accuracy of channel estimation shown with the solid line in FIG. 13.

Figure 14:
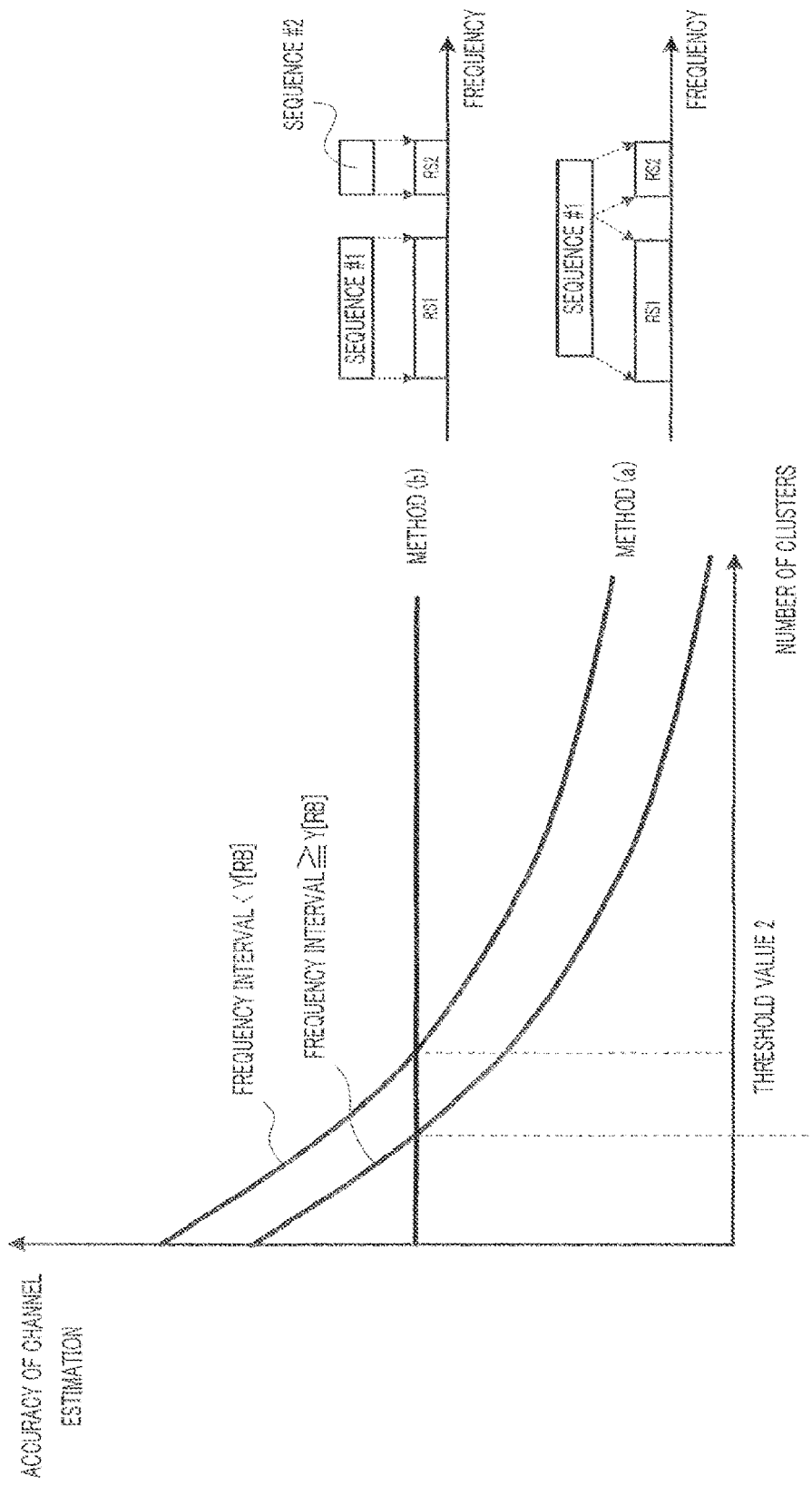
FIG. 14 shows adjustment of threshold values used to switch reference signal formation methods.

Further, as shown in FIG. 14, the accuracy of channel estimation of the first reference signal formation method depends on the frequency interval between clusters. That is, the accuracy curve of channel estimation shifts upward as the frequency interval between clusters is narrower. Therefore, when the frequency interval between clusters changes, the point at which the accuracy of channel estimation of the first reference signal formation method and the accuracy of channel estimation of the second reference signal formation method are reversed also shifts.

Therefore, because threshold value setting section 105 adjusts a switch threshold value in reference signal control section 106 based on the frequency interval between clusters, it is possible to accurately select a reference signal formation method.

The above-described switch control of a transmission method in terminal 100 is summarized in FIG. 15. That is, when the frequency interval is Y or greater, N1 is used as a switch threshold value, and transmission method (a) and transmission method (b) are switched based on which one of this threshold value and the number of clusters is smaller or greater. On the other hand, when the frequency interval is smaller than Y, N2 is used as a switch threshold value.

As described above, according to the present embodiment, in terminal 100 that transmits a reference signal using n (n is a natural number of 2 or greater) band blocks (here, equivalent to clusters) which are positioned at intervals from each other in a direction of frequency, reference signal control section 106 switches the reference signal formation methods in reference signal generation section 107 between the first formation method and the second formation method, based on the number of band blocks n.

By this means, it is possible to select a more advantageous reference signal formation method with respect to the accuracy of channel estimation, and, as a result of this, it is possible to improve the accuracy of channel estimation.

Further, in terminal 100, threshold value setting section 105 adjusts the switch threshold value based on the frequency interval between band blocks.

By this means, it is possible to accurately select a reference signal formation method, and, as a result of this, it is possible to further improve the accuracy of channel estimation.

Further, a case has been described with the above description where each cluster is treated as a band block. However, the present disclosure is by no means limited to this, and it is equally possible to use a band block formed with a plurality of clusters as an equivalent of the cluster described in Embodiment 1. That is, when there are a plurality of band blocks formed with a plurality of clusters, it is possible to employ a first formation method in which subsequences corresponding to the number of band blocks are formed as a reference signal by dividing one base code sequence into the length to match each band block, and a second formation method in which code sequences corresponding to the number of band blocks are formed as a reference signal by adjusting the lengths of base code sequences corresponding to the number of band blocks to match each band block.

Figure 16:
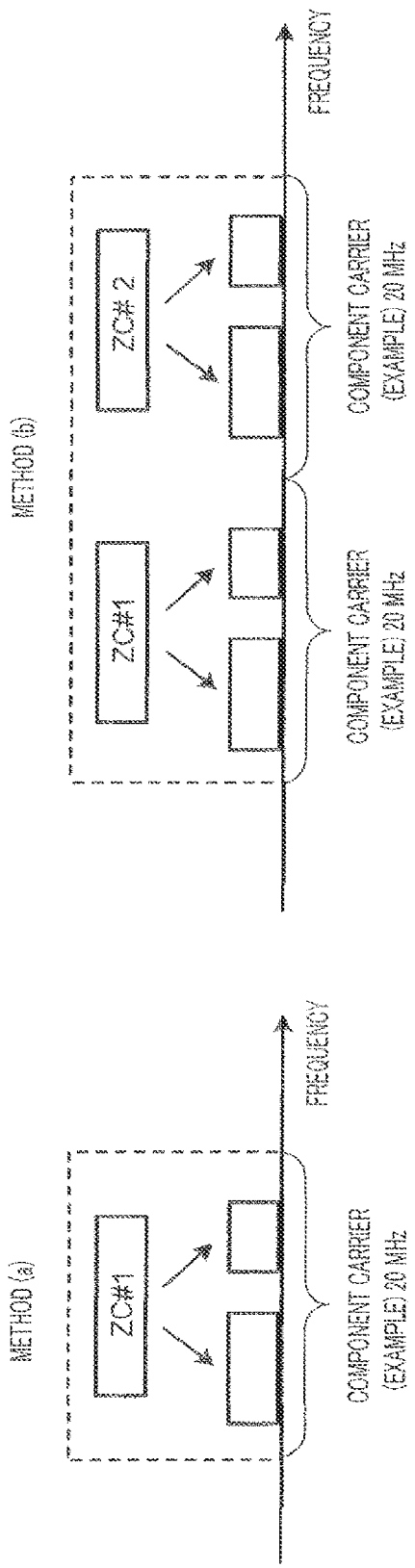
FIG. 16 shows an embodiment when applied to LTE-Advanced.

For example, a component carrier, which is a predetermined system bandwidth in LTE-Advanced, is equivalent to this band block. For a component carrier, a maximum value of the number of clusters that can be contained is defined by, for example, restricting the signaling format. Therefore, in such a case, it is possible to switch reference signal transmission methods according to the number of component carriers. For example, in the case where the maximum value of the number of clusters in component carrier is 2, as shown in FIG. 16, it is possible to obtain the same effects as in above Embodiment 1 even by selecting transmission method (a) when the number of component carriers is 1, while selecting transmission method (b) when the number of component carriers is 2 or greater.

Embodiment 2

A case will be described here with Embodiment 2 where reference signal formation methods are switched based on a "cluster bandwidth." That is, reference signal formation methods are switched based on a total bandwidth of n clusters in addition to a switch threshold value and the number of clusters n. Further, basic configurations of a terminal and a base station according to the present embodiment are the same as the configurations of the terminal and the base station explained in Embodiment 1. Therefore, the terminal and the base station according to the present Embodiment will also be explained using FIGS. 9 and 10.

[Configuration of Terminal]

Reference signal control section 106 in terminal 100 according to Embodiment 2 receives information about clusters from resource assignment information setting section 104, and first calculates a "cluster bandwidth." This "cluster bandwidth" means an average bandwidth per cluster and can be obtained by dividing a total bandwidth of n clusters by the number of clusters n.

Then, reference signal control section 106 compares which one of the cluster bandwidth and a switch threshold value is smaller or greater, and, based on the result of the comparison, determines a reference signal formation method in reference signal generation section 107. Reference signal control section 106 switches reference signal formation methods in reference signal generation section 107 by outputting identification information of the determined reference signal formation method to reference signal generation section 107.

[Configuration of Base Station]

Further, channel estimation control section 206 in base station 200 according to Embodiment 2 switches the channel estimation method in channel estimation section 207 to the channel estimation method corresponding to the reference signal transmission method in terminal 100. That is, channel estimation control section 206 receives information about clusters from resource assignment information setting section 204, and first calculates a "cluster bandwidth," as is the case with reference signal control section 106.

Then, channel estimation control section 206 compares which one of the cluster bandwidth and a switch threshold value is smaller or greater, and, based on the result of the comparison, determines a reference signal formation method in reference signal generation section 107. Channel estimation control section 206 switches channel estimation methods in channel estimation section 207 by outputting identification information of the determined channel estimation method to channel estimation section 207.

[Operation of Terminal]

As described above, in terminal 100, reference signal control section 106 switches reference signal formation methods by controlling reference signal generation section 107.

Figure 17:
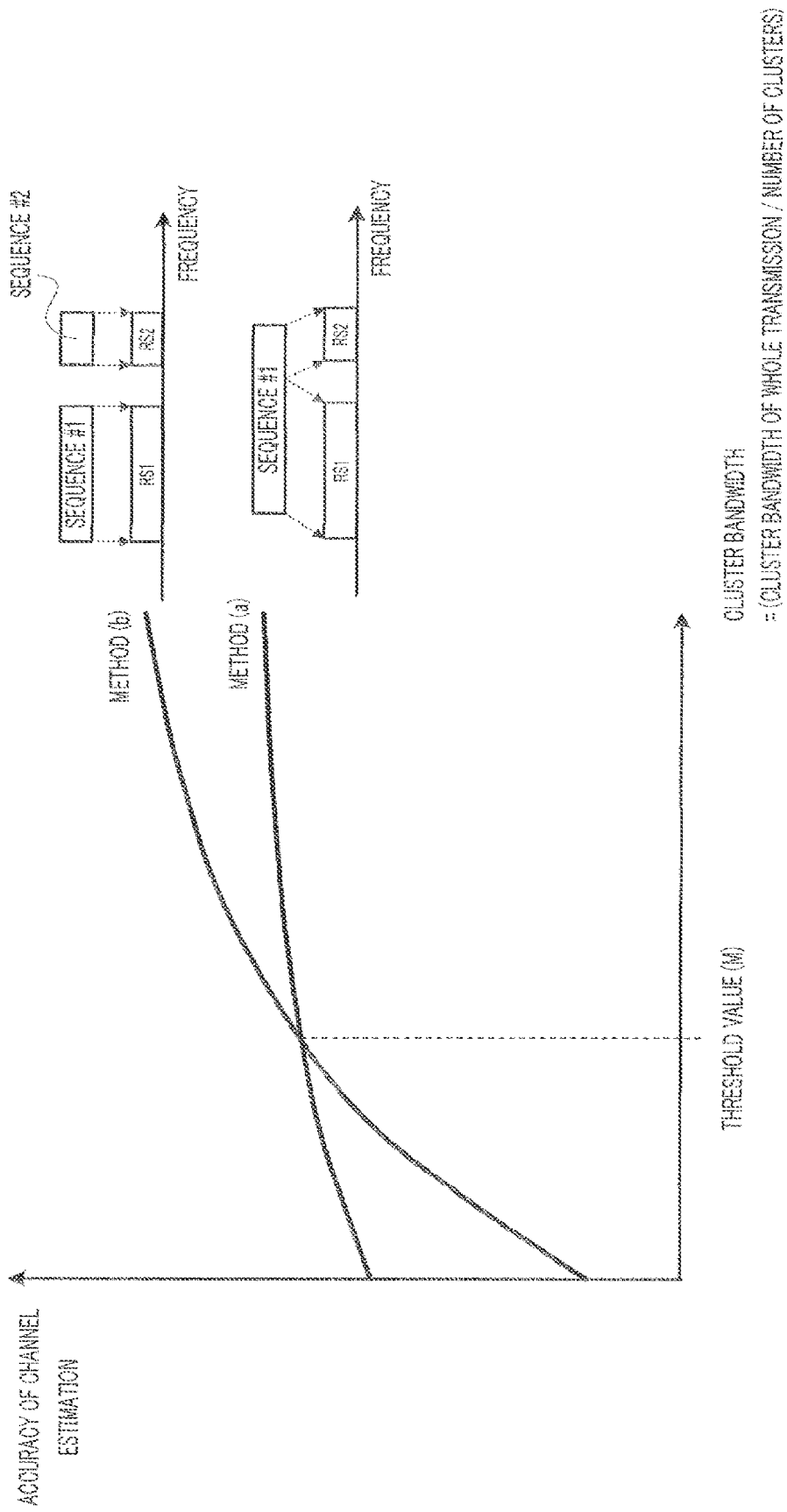
FIG. 17 shows a relationship between the first reference signal formation method and the second reference signal formation method according to Embodiment 2.

The above-described first reference signal formation method (transmission method (a)) and second reference signal formation method (transmission method (b)) have a relationship shown in FIG. 17, when the horizontal axis of the graph shows a cluster bandwidth.

Especially, as shown in FIG. 17, the performance of transmission method (a) depends on the cluster bandwidth and deteriorates as the cluster bandwidth is narrower. When the cluster bandwidth is narrower, the number of clusters tends to increase. Therefore, when the number of non-continuous points in channel variation in calculating channel estimation increases, interference increases. Further, the performance of transmission method (b) also depends on the cluster bandwidth and deteriorates as the cluster bandwidth is narrower. Because the correlation length becomes smaller according to the cluster bandwidth, the interference suppression effects are lowered. This performance deterioration in transmission method (b) is greater than the performance deterioration in transmission method (a).

On the other hand, the performance in transmission method (b) is greater than the performance in transmission method (a) when the cluster bandwidth is wider. In transmission method (b), when the cluster bandwidth is greater, sufficient interference suppression effects can be obtained and interference can be suppressed to a noise level. Further, while, in transmission method (b), the performance does not deteriorate even the number of clusters is large, in transmission method (a), great interference due to non-continuous of channel variation occurs even when the cluster bandwidth is wide.

That is, here again, with a certain cluster bandwidth M being a threshold, the accuracy of channel estimation of the first reference signal formation method and the accuracy of channel estimation of the second reference signal formation method are reversed. That is, when the cluster bandwidth is M or narrower, the channel estimation value of the first reference signal formation method exceeds the channel estimation value of the second reference signal formation method, while, inversely, when the cluster bandwidth is wider than M, the channel estimation value of the second reference signal formation method exceeds the channel estimation value of the first reference signal formation method.

Figure 18:
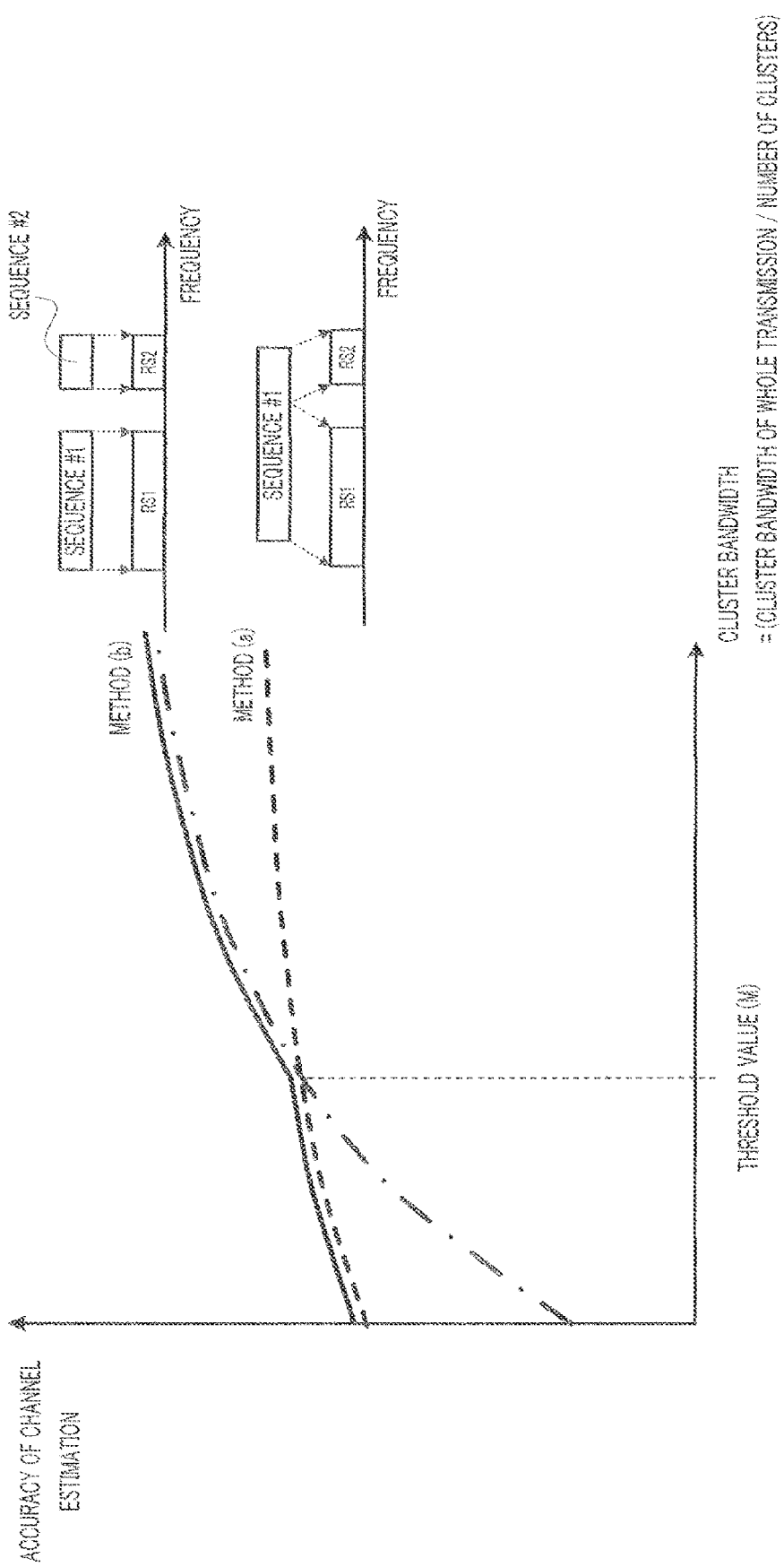
FIG. 18 shows switch control between the first reference signal formation method and the second reference signal formation method according to Embodiment 2.

Therefore, by using a cluster bandwidth of the point at which the accuracy of channel estimation of the first reference signal formation method and the accuracy of channel estimation of the second reference signal formation method are reversed as a switch threshold value, it is possible to select a more advantageous reference signal formation method with respect to the accuracy of channel estimation according to the cluster bandwidth. By performing this kind of switch control of reference signal formation methods, base station 200 can obtain the accuracy of channel estimation shown with the solid line in FIG. 18.

Figure 19:
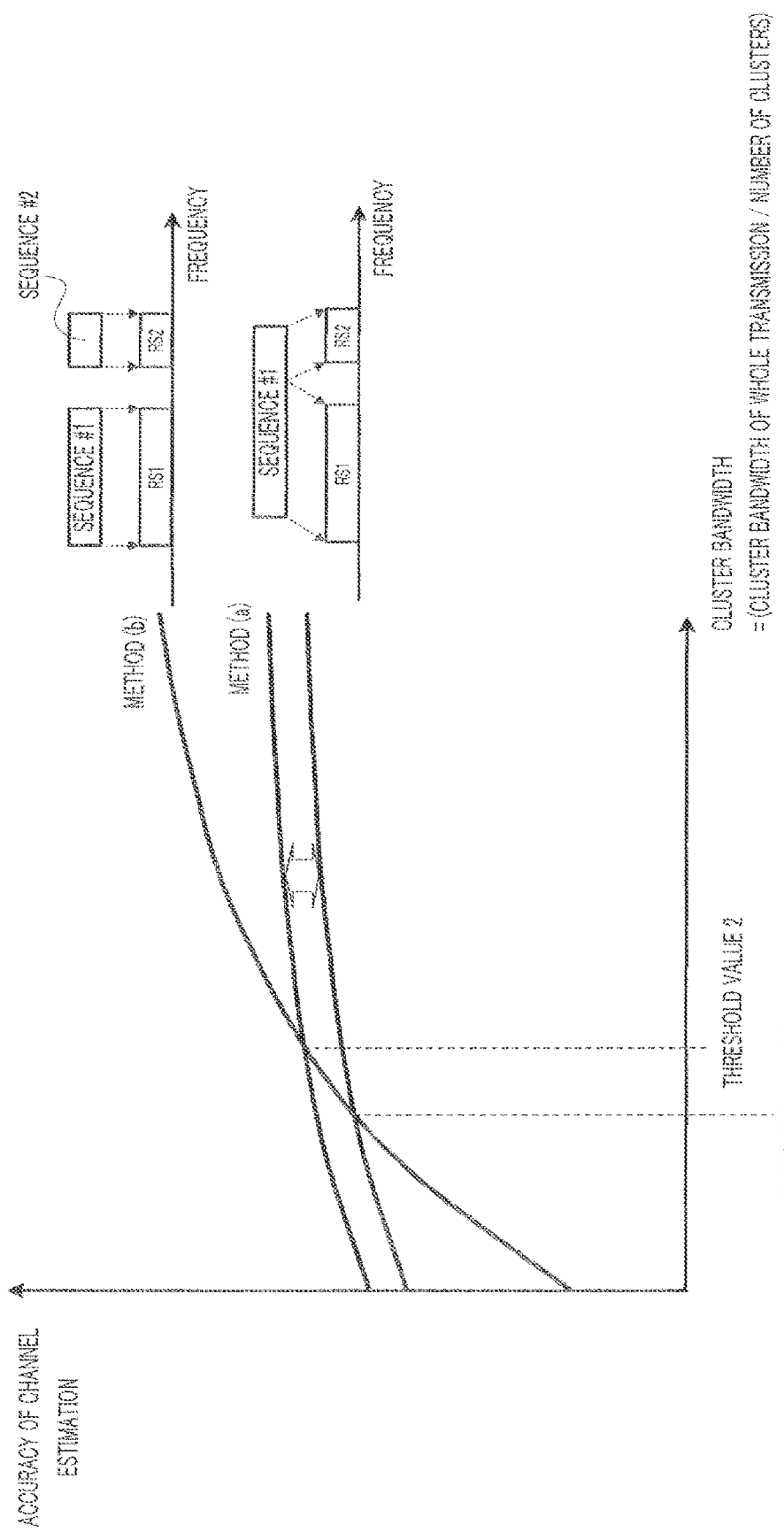
FIG. 19 shows adjustment of threshold values used to switch reference signal formation methods.

Further, as shown in FIG. 19, the accuracy of channel estimation of the first reference signal formation method depends on the frequency interval between clusters even when the horizontal axis of the graph shows a cluster bandwidth. That is, the accuracy curve of channel estimation shifts upward as the frequency interval between clusters is narrower. Therefore, when the frequency interval between clusters changes, the point at which the accuracy of channel estimation of the first reference signal formation method and the accuracy of channel estimation of the second reference signal formation method are reversed also shifts.

Therefore, because threshold value setting section 105 adjusts a switch threshold value in reference signal control section 106 based on the frequency interval between clusters, it is possible to accurately select a reference signal formation method.

As described above, according to the present embodiment, in terminal 100, reference signal control section 106 switches reference signal formation methods based on the "cluster bandwidth." That is, reference signal formation methods are switched based on a total bandwidth of n clusters in addition to a switch threshold value and the number of clusters n.

By this means, it is possible select a more advantageous reference signal formation method with respect to the accuracy of channel estimation, and, as a result of this, it is possible to improve the accuracy of channel estimation.

Although cases have been described with the above embodiments where reference signal formation methods are switched based on the cluster bandwidth, it is possible to use the narrowest bandwidth out of the bandwidths of n clusters instead of the cluster bandwidth.

Other Embodiment

Cases have been described with above Embodiment 1 and Embodiment 2 where both of reference signal transmission methods in terminal 100 and channel estimation methods in base station 200 switch according to the number of clusters or a cluster bandwidth. However, it is possible to switch only channel estimation methods in base station 200. That is, it is possible to fix the reference signal transmission method in terminal 100 to transmission method (a) or transmission method (b), and switch channel estimation methods in base station 200 according to the number of clusters or a cluster bandwidth. By this means, it is also possible to obtain effects similar to the effects of Embodiment 1 and Embodiment 2.

Also, although cases have been described with the above embodiments as examples where the present disclosure is configured by hardware, the present disclosure can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSIs as a result of the advancement of semiconductor technology or a derivative other technology, it is naturally also possible to carry out function block integration using this technology. Application of biotechnology is also possible.

The disclosure of Japanese Patent Application No. 2009-018632, filed on Jan. 29, 2009, including the specification, drawings and abstract, is incorporated herein by reference in its entirety.

INDUSTRIAL APPLICABILITY

A radio transmission apparatus and a reference signal transmission method according to the present disclosure are useful for improving the accuracy of channel estimation.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

[Note: essential matter cannot be incorporated by reference from foreign patents, foreign patent application or non-patent publications; however the U.S. PTO should allow the improperly incorporated subject matter to be expressly added to the specification by way of amendment without affecting the filing date. The ability to incorporate by reference to the ADS is untested. We strongly encourage you to explicitly list those references you wish to incorporate by reference at the appropriate location within the sentence.]

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit to control a process, the process comprising:
transmitting, to a terminal, allocation information indicating one or more sets of consecutive frequency resources allocated in each of one or more uplink component carriers, which include a first component carrier and a second component carrier, the first component carrier and the second component carrier having different frequencies, and more than one set of consecutive frequency resources, of said one or more sets of consecutive frequency resources, being spaced apart from each other along a frequency axis; and
receiving one uplink reference signal sequence or plural uplink reference signal sequences from the terminal that performs, based on the allocation information, one operation selected from two operations including:
a first operation of generating the plural uplink reference signal sequences including a first sequence and a second sequence, mapping the generated first sequence in said one or more sets of consecutive frequency resources allocated in the first component carrier, mapping the generated second sequence in said one or more sets of consecutive frequency resources allocated in the second component carrier, and controlling transmission of the mapped first sequence and the mapped second sequence; and
a second operation of generating the one uplink reference signal sequence, mapping the generated one uplink reference signal sequence in said more than one set of consecutive frequency resources allocated in said one uplink component carrier by dividing the generated one uplink reference signal sequence into more subsequences correspondingly to said more than one set of consecutive frequency resources, respectively, and controlling transmission of the mapped one uplink reference signal sequence.

2. The integrated circuit according to claim 1, comprising:
circuitry which, in operation, controls the process;
at least one input coupled to the circuitry, wherein the at least one input, in operation, inputs data; and
at least one output coupled to the circuitry, wherein the at least one output, in operation, outputs data.

3. The integrated circuit according to claim 1, wherein the one uplink reference signal sequence or plural uplink reference signal sequences are cyclic shift sequences.

4. The integrated circuit according to claim 1, wherein when a number of said one or more uplink component carriers is two, a number of the plural uplink reference signal sequences is two.

5. The integrated circuit according to claim 1, wherein a sequence number of the first sequence is different from a sequence number of the second sequence.

6. The integrated circuit according to claim 1, wherein a first length of the first sequence corresponds to a bandwidth of the one or more sets of consecutive frequency resources allocated in the first component carrier, and a second length of the second sequence corresponds to a bandwidth of the one or more sets of consecutive frequency resources allocated in the second component carrier.

7. The integrated circuit according to claim 1, wherein a length of the first sequence mapped in one set of consecutive frequency resources allocated in the first component carrier is different from a length of the second sequence mapped in more sets of consecutive frequency resources allocated in the second component carrier.

8. An integrated circuit comprising circuitry, which, in operation:
controls transmitting, to a terminal, allocation information indicating one or more sets of consecutive frequency resources allocated in each of one or more uplink component carriers, which include a first component carrier and a second component carrier, the first component carrier and the second component carrier having different frequencies, and more than one set of consecutive frequency resources, of said one or more sets of consecutive frequency resources, being spaced apart from each other along a frequency axis; and
controls receiving one uplink reference signal sequence or plural uplink reference signal sequences from the terminal that performs, based on the allocation information, one operation selected from two operations including:
a first operation of generating the plural uplink reference signal sequences including a first sequence and a second sequence, mapping the generated first sequence in said one or more sets of consecutive frequency resources allocated in the first component carrier, mapping the generated second sequence in said one or more sets of consecutive frequency resources allocated in the second component carrier, and controlling transmission of the mapped first sequence and the mapped second sequence; and a second operation of generating the one uplink reference signal sequence, mapping the generated one uplink reference signal sequence in said more than one set of consecutive frequency resources allocated in said one uplink component carrier by dividing the generated one uplink reference signal sequence into more subsequences correspondingly to said more than one set of consecutive frequency resources, respectively, and controlling transmission of the mapped one uplink reference signal sequence.

9. The integrated circuit according to claim 8, comprising:
at least one input coupled to the circuitry, wherein the at least one input, in operation, inputs data; and
at least one output coupled to the circuitry, wherein the at least one output, in operation, outputs data.

10. The integrated circuit according to claim 8, wherein the one uplink reference signal sequence or plural uplink reference signal sequences are cyclic shift sequences.

11. The integrated circuit according to claim 8, wherein when a number of said one or more uplink component carriers is two, a number of the plural uplink reference signal sequences is two.

12. The integrated circuit according to claim 8, wherein a sequence number of the first sequence is different from a sequence number of the second sequence.

13. The integrated circuit according to claim 8, wherein a first length of the first sequence corresponds to a bandwidth of the one or more sets of consecutive frequency resources allocated in the first component carrier, and a second length of the second sequence corresponds to a bandwidth of the one or more sets of consecutive frequency resources allocated in the second component carrier.

14. The integrated circuit according to claim 8, wherein a length of the first sequence mapped in one set of consecutive frequency resources allocated in the first component carrier is different from a length of the second sequence mapped in more sets of consecutive frequency resources allocated in the second component carrier.

* * * * *